H. J. HOYT.

MACHINE FOR TREATING PLASTIC MATERIALS.

APPLICATION FILED MAR. 2, 1917.

Reissued June 10, 1919.

14,663.

4 SHEETS—SHEET 1.

Inventor.

Homer J. Hoyt,

By Ernest Hopkins

Attorney.

H. J. HOYT.

MACHINE FOR TREATING PLASTIC MATERIALS.

APPLICATION FILED MAR. 2, 1917.

Reissued June 10, 1919.

14,663.

4 SHEETS—SHEET 2.

Inventor.
Homer J. Hoyt,
By Ernest Hopkinson
Attorney.

H. J. HOYT.

MACHINE FOR TREATING PLASTIC MATERIALS.

APPLICATION FILED MAR. 2, 1917.

Reissued June 10, 1919.

14,663.

4 SHEETS—SHEET 3.

Inventor.

Homer J. Hoyt,

By Ernest Hopkinson

Attorney.

H. J. HOYT.

MACHINE FOR TREATING PLASTIC MATERIALS.

APPLICATION FILED MAR. 2, 1917.

Reissued June 10, 1919.

14,663.

4 SHEETS—SHEET 4.

Inventor.

Homer J. Hoyt,

By Ernest Hopkinson

Attorney.

UNITED STATES PATENT OFFICE.

HOMER J. HOYT, OF DETROIT, MICHIGAN, ASSIGNOR TO MORGAN & WRIGHT, A CORPORATION OF MICHIGAN.

MACHINE FOR TREATING PLASTIC MATERIALS.

14,663. Specification of Reissued Letters Patent. Reissued June 10, 1919.

Original No. 1,163,089, dated December 7, 1915, Serial No 21,512, filed April 15, 1915. Application for reissue filed March 2, 1917. Serial No. 152,157.

*To all whom it may concern:*

Be it known that I, HOMER J. HOYT, a citizen of the United States, residing in Detroit, county of Wayne, and State of Michigan, have invented certain new and useful Improvements in Machines for Treating Plastic Materials, of which the following is a full, clear, and exact description.

This invention relates to machines for treating plastic materials such as in the preparation of rubber compounds for making vulcanized rubber articles, and has for an object the production of a machine which will operate economically and rapidly and with the smallest amount of attention. A further object of the invention is to produce a machine in which the plastic material may be subjected to any desired pressure preferably a vacuum during the mixing or rolling process, while at the same time the rolls may be heated to the temperature required during such mixing or milling operations.

For a detailed description of this form of the invention, reference may be had to the following specification and to the accompanying drawings forming a part thereof, in which.

Figure 1:
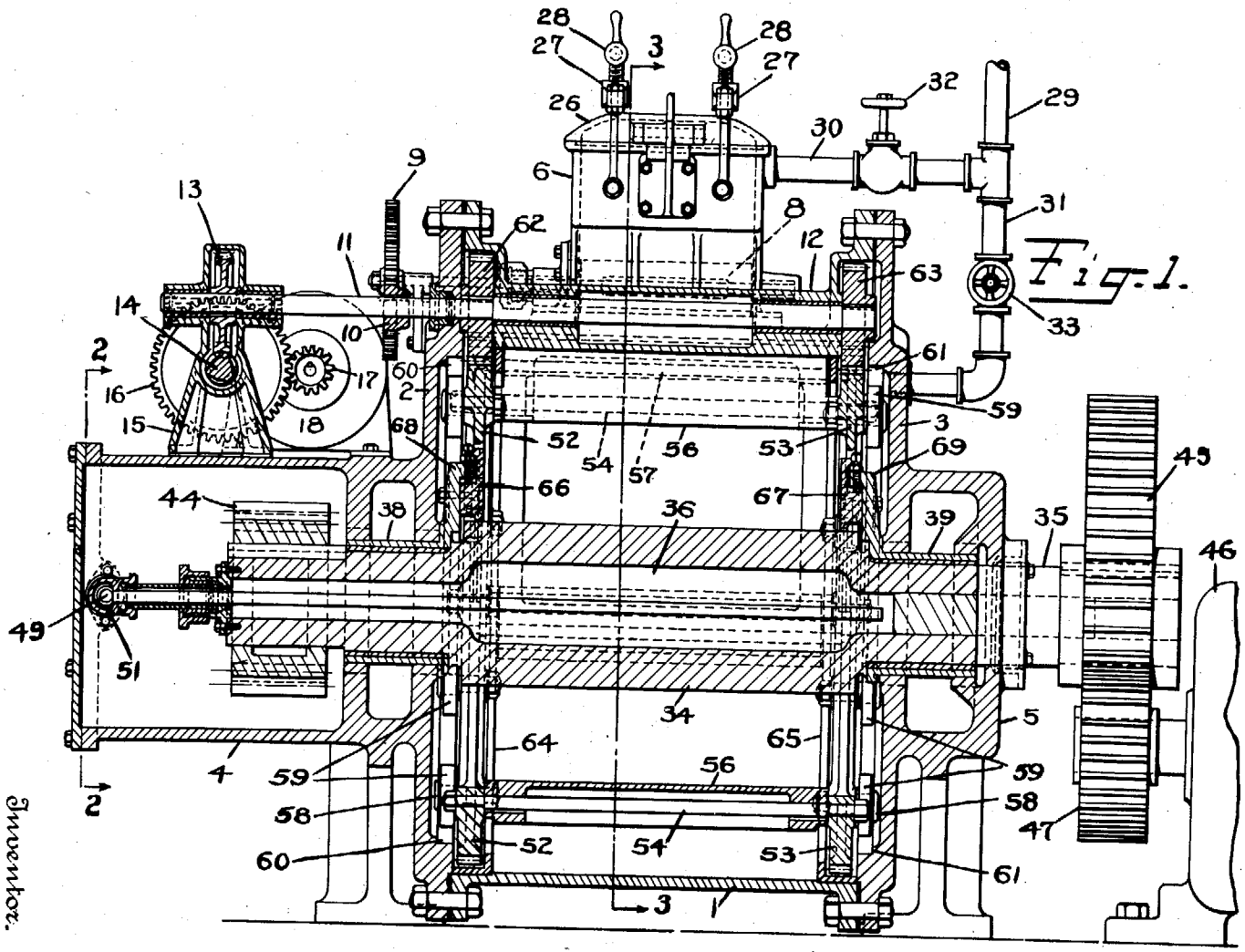
Figure 1 is a vertical longitudinal sectional view taken substantially on the line 1—1, Fig. 3.
Figure 2:
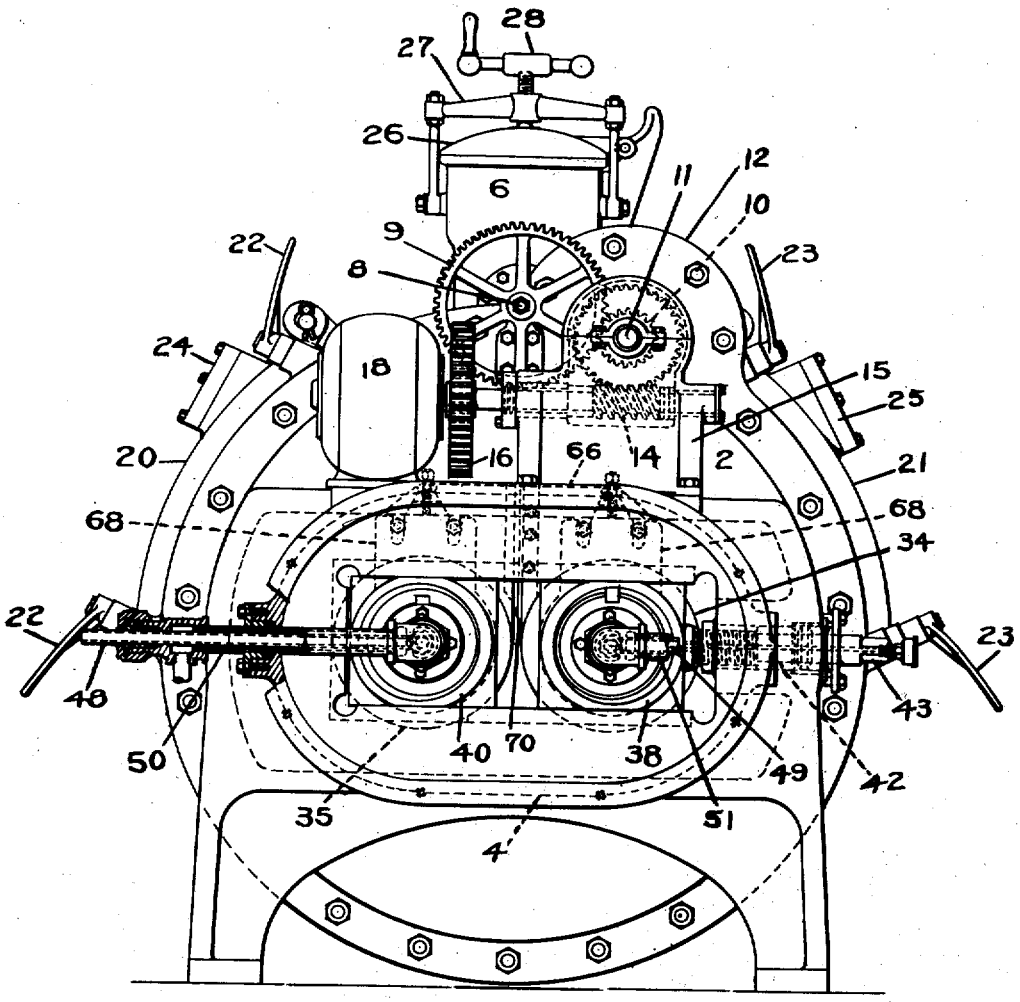
Fig. 2 is an end elevation of that end of the machine to which the steam or other heating means is applied, and showing the cover for the gears and pipe connections removed, as indicated by the line 2—2, Fig. 1.
Figure 3:
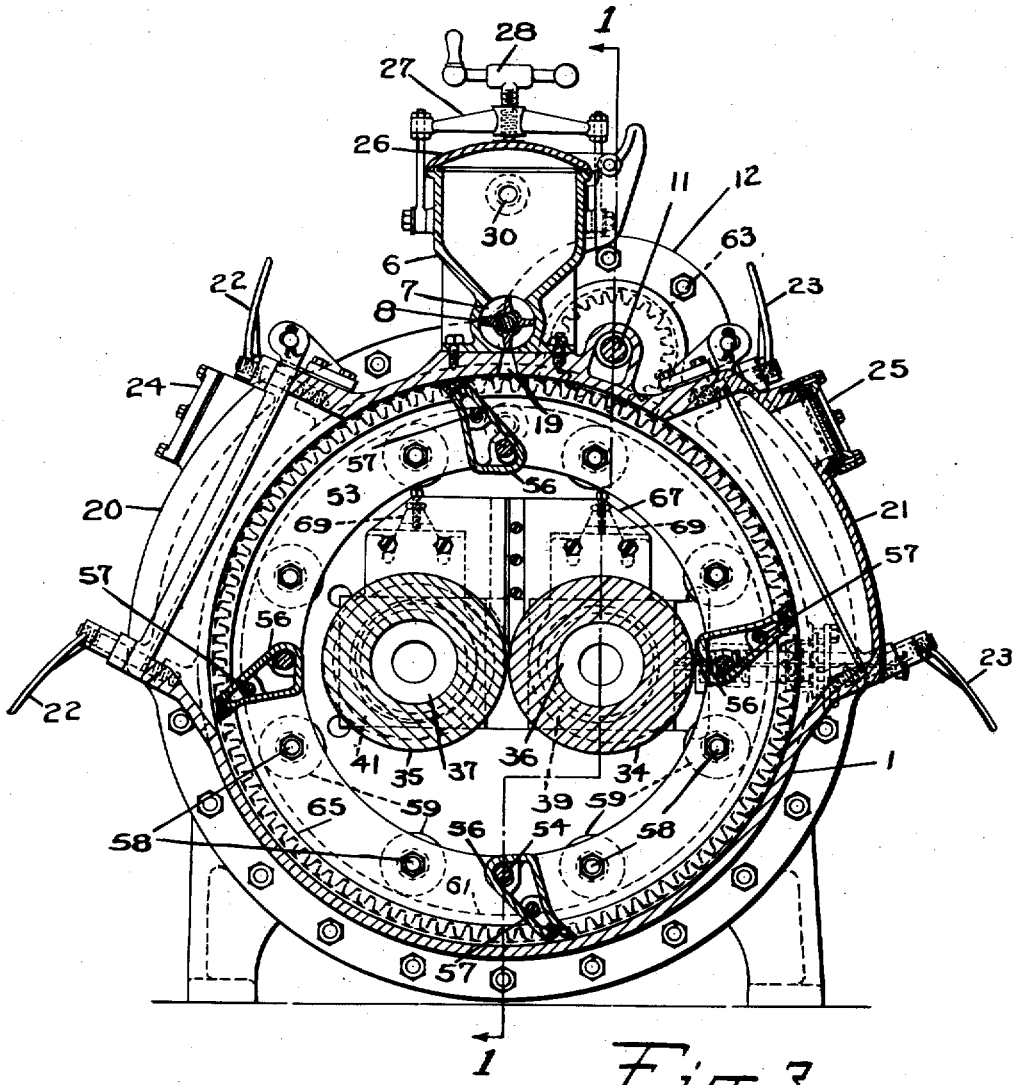
Fig. 3 is a transverse sectional view taken substantially on the line 3—3, Fig. 1.

Referring to the drawings, in Fig. 1 the numeral 1 indicates a cylindrical casing forming the main closed chamber of the machine. This chamber also has heads 2 and 3 provided with auxiliary casings 4 and 5 in which the adjustable bearings, pipe connections and gears of the rolls are located. Mounted centrally on the cylindrical casing 1 is a box or hopper 6 from which materials such as litharge, sulfid, etc., may be introduced into the main chamber. The bottom of the hopper is V-shaped, as indicated in Fig. 3, and communicates with a cylindrical opening 7 in which is located a bladed shaft 8 which constitutes a feeder to force the material from the hopper 6 into the main chamber at a definite rate. On the end of the bladed shaft 8 is mounted a gear 9 (Fig. 2) which meshes with a pinion 10 mounted on a longitudinal shaft 11. This shaft extends through a semi-cylindrical projection 12 on the main cylindrical casing 1 and carries thereon the gears for driving the conveying device for the contained material. The outer end of the shaft 11, as indicated in Fig. 1, carries thereon a worm wheel 13 which meshes with a worm gear 14 extending transversely across the head of the machine and mounted in suitable bearings 15 carried by the casing 4. As indicated in Fig. 2, the left hand end of the shaft 14 carries a gear 16 which meshes with a pinion 17 on the shaft of the electric or other motor 18. Through the connections just described, the bladed shaft 8 at the bottom of the hopper 6 is caused to revolve and thereby force material from the hopper through the small opening 19 in the cylindrical casing 1. The casing 1 is also provided with doors 20 and 21 permitting access to the interior of the casing and these are sealed so that they form an air-tight closure by suitable bolts or other clamps, as indicated at 22 and 23. Glass windows 24 and 25 are provided in these doors for permitting inspecting of the contents of the casing during the milling operation.

The hopper 6 is also provided with a hinged cover 26 held in position by a pivoted yoke 27, through which pass hand-screws 28, and a pipe 29 having branches 30 and 31 provided with valves 32 and 33 communicating, respectively, with the hopper 6 and the interior of the main casing through the head 3. The pipe 29 is connected to a pump or other suitable device, whereby any desired fluid pressure may be maintained in the mixing chamber 1 and hopper 6. A reduced pressure is preferably maintained in the mixing chamber and hopper, the pressure being controlled through the valves 32 and 33. The mixing rolls 34 and 35 which are immediately below the hopper both pass through the heads 2 and 3 and are hollow having enlarged inner chambers 36 and 37, as indicated in Figs. 1 and 3. The journals for these rolls pass through adjustable bearings or boxes 38, 39, 40 and 41, the boxes or bearings being forced toward each other by a suitable screw device, indicated in dotted lines in Fig. 2, which device terminates in a shaft 42 having an angular head 43 to which a suitable wrench may be applied.

The left-hand ends of these rolls 34 and 35 (Fig. 1) are provided, respectively, with intermeshing driving gears, one of which is indicated by the numeral 44 and shown in section at the end of the roll 34. A corresponding gear (not shown) is mounted on the end of roll 35 and the number of teeth are preferably different from that of the gear 44, in order to cause the rolls to revolve at slightly different speeds. This is for the purpose of giving the grinding or kneading action to the material which would not take place should the gears be both driven at the same speed.

The opposite end of the roll 35 projects through the auxiliary casing 5 and has keyed to its outer end the main driving gear 45 which is driven through any suitable means, such as by an electric motor 46 having a pinion 47 meshing with the gear 45. Steam is admitted to the interior of the rolls 34 and 35 through the pipe connections 48 and 49 and the used steam is allowed to exhaust through the pipes 50 and 51 which are concentric with the pipes 48 and 49. These pipes are both provided with suitable slip joints and stuffing boxes, as indicated, so as to allow adjustment of the rolls relatively. The mixing rolls are adapted to receive material automatically from the hopper and to mix such material with plastic substance on the rolls. These rolls during the mixing operation heat the plastic substance, which is thus better able to retain the sulfur, etc., as it is gradually fed from the hopper.

Figure 4:
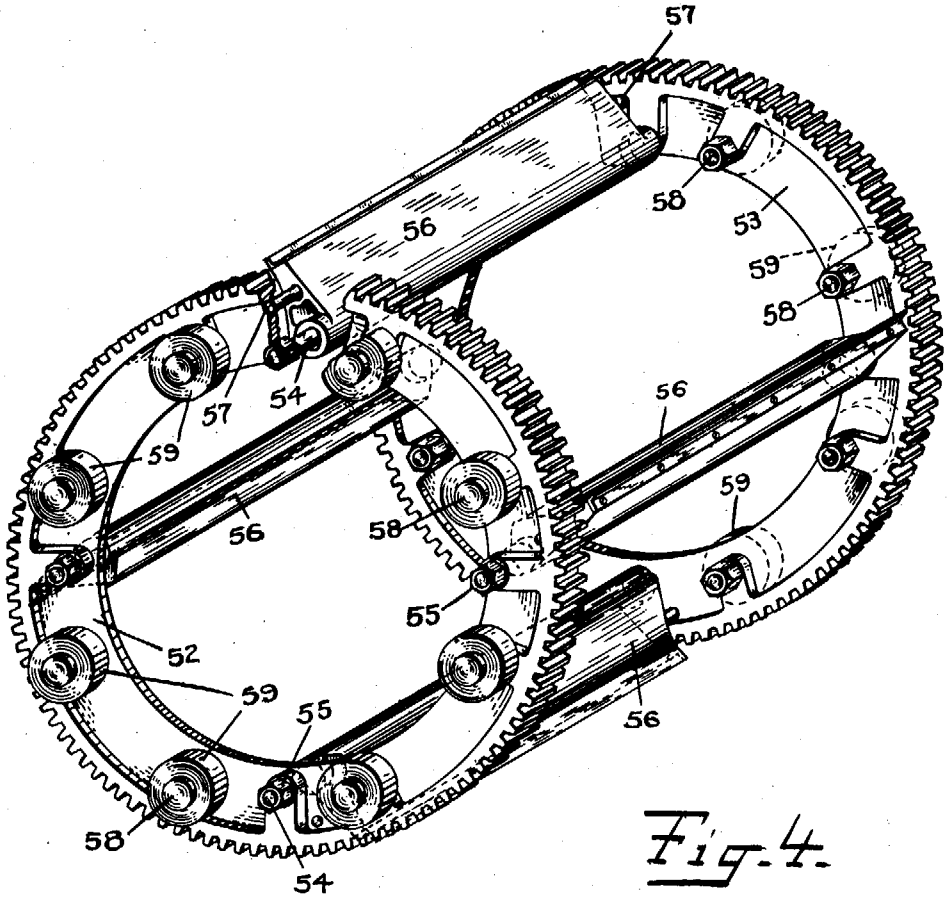
Fig. 4 is an isometric view of the means for conveying the plastic material from one side to the other of the rolls within the mixing chamber.

The device for conveying the material from the lower side to the upper side of the rolls is illustrated in Fig. 4. This consists of two annular floating gears 52 and 53 which are connected by transverse rods 54 held in position on the gears 52 and 53 by the nuts 55. These rods 54 carry wedge-shaped blades or paddles 56 which are adapted to oscillate pivotally on said rods, their inward motion, however, being limited by pins 57 projecting from the web portion of the said gears and entering corresponding slots in the ends of the blades 56. The gears are also provided with a series of studs 58 on which are mounted corresponding rollers 59. These are adapted to bear on flanges 60 and 61 on the heads 2 and 3, respectively, of the main casing (Fig. 1).

In this manner the cylindrical cage or frame, comprising the gears 52 and 53, the rods 54 and the blades 56, and encircling the mixing rolls, is enabled to rotate within the main casing serving as a rotary conveyer. The same are driven as follows: The shaft 11 above referred to, which extends through the semi-cylindrical projection 12 of the casing 1, is provided with gears 62 and 63 which mesh respectively with the gears 52 and 53. A rotation of the shaft 11 caused by the motor 18 acting through the gears 17, 16, worm shaft 14 and worm gear 13, drives the gears 52 and 53, thereby carrying the blades or conveying elements 56 around the rolls from the lower side to the upper.

The plastic material is prevented from coming into contact with the bearings and with the teeth of the gears by annular flanges 64 and 65 and by the angular guards 66 and 67 which are adjustable on the arms 68 and 69 extending from the bearings or boxes 38 and 39. These guards ride on the upper surface of the rolls and extend down between them, as indicated at 70 in Fig. 2, the guards for each roll overlapping each other but being slidable relatively in order to move with the adjustment of their corresponding rolls.

Referring to Fig. 3, it will be seen that as the floating gears 52 and 53 are caused to rotate in counter-clockwise direction, the blades 56 will contact with the inner surface of the body of the mill and the material will be scooped from the bottom of the chamber, carried up on the right hand side thereof, and then dropped from the conveying elements when they reach a position near the top of the chamber. The material will then again pass through the rolls and after reaching the bottom of the hopper will be carried to the upper side of the same.

Having thus described this form of the invention, I do not wish to be understood as limiting myself to the details of form and arrangements of parts set forth, for various changes may be made without departing from the spirit and scope of my invention.

What I claim and desire to protect by Letters Patent is:

1. In a mixing mill, a closed chamber, means for controlling the fluid pressure therein, a device in said chamber for mixing or kneading plastic material, and a rotary conveying means movable relatively to said chamber and adapted to carry said material from below said device to the upper side thereof.

2. In a mixing mill, a closed chamber, means for producing a reduced air pressure therein, a device in said chamber for mixing or kneading plastic material, and a series of movable blades adapted to carry said material from the bottom to the top of said chamber.

3. In a mixing mill, a closed chamber, means for controlling the fluid pressure therein, a device in said chamber for mixing or kneading plastic material, a rotatable frame, and pivoted blades carried on said frame to convey said material from the bottom to the top of said chamber.

4. In a mixing mill, a closed chamber, means for controlling the fluid pressure therein, a device in said chamber for mixing or kneading plastic material, a rotary frame comprising gears, and blades pivoted between said gears and adapted to carry said material from the bottom to the top of said chamber.

5. In a mixing mill, a closed chamber, means for controlling the fluid pressure therein, a device in said chamber for mixing or kneading plastic material, a conveyer comprising annular gears, rods connecting said gears, and conveyer elements carried on said rods.

6. In a mixing mill, a closed chamber, means for controlling the fluid pressure therein, a device for mixing or kneading plastic material, a conveyer comprising annular gears, rods connecting said gears, and blades pivoted on said rods.

7. In a vacuum mill, a closed casing, means for producing a reduced air pressure therein, mixing rolls therein, and a rotary conveyer comprising a cylindrical frame extending about said rolls, and adapted to carry the material being treated from the lower side to the upper side of said rolls, and automatic means for simultaneously rotating the rolls and conveyer within said casing.

8. In a vacuum mill, a closed casing, mixing rolls therein, means for producing a reduced air pressure therein, a rotary conveyer comprising a rigid cylindrical frame encircling said rolls, and conveyer blades carried on said frame.

9. In a vacuum mill, a closed casing, means for producing a reduced air pressure therein, mixing rolls therein, a rotary conveyer comprising a cylindical frame encircling said rolls, and conveyer blades pivoted on the transverse members of said frame and adapted to contact with the inner surface of said casing.

10. In a vacuum mill, a closed casing, means for producing a reduced air pressure therein, mixing rolls therein, a rotary conveyer comprising annular gears encircling said rolls, rods connecting said gears, conveyer blades pivoted on said rods and adapted to contact with the inner surface of said casing, and driving pinions for said annular gears supported by said casing.

11. In a vacuum mill, a closed casing, means for producing a reduced air pressure therein, mixing rolls therein, a rotary conveyer comprising annular gears encircling said rolls, rods connecting said gears, conveyer blades pivoted on said rods and adapted to contact with the inner surface of said casing, and driving pinions for said annular gears located in recesses in said casing.

12. In a mixing mill, a closed chamber, mixing rolls within the said chamber, relatively adjustable bearings for the respective rolls, the said bearings having portions extending laterally of the rolls, and segmental guards secured to the said laterally extending portions of the bearings and slidably connected with each other, the said guards riding on the upper surface of the rolls and extending down between them.

13. In a mixing mill, a stationary closed casing, a mixing or kneading device therein, a conveyer comprising a cylindrical frame disposed within said casing, annular gears on the ends of said frame and contact devices carried by said gears and adapted to travel on the inner surface of said casing to revolubly support said frame.

14. In a mixing mill, a main casing, a mixing or kneading device therein, a conveyer comprising a cylindrical frame, annular gears on the ends of said frame, and anti-friction rollers carried by said gears and adapted to travel in guides on the inner surface of said casing to revolubly support said frame.

15. In a machine of the kind described, in combination, a stationary closed chamber, mixing rolls therein, a supply of material to be mixed, and a feed device within said chamber adapted to feed said material to said rolls automatically.

Signed at Detroit, Michigan, this 5th day of January, 1917.

HOMER J. HOYT.